Dec. 8, 1953 R. MINKOW 2,661,716
MACHINE FOR APPLYING GLUE TO SHEET MATERIAL
Filed Jan. 2, 1951 5 Sheets-Sheet 1
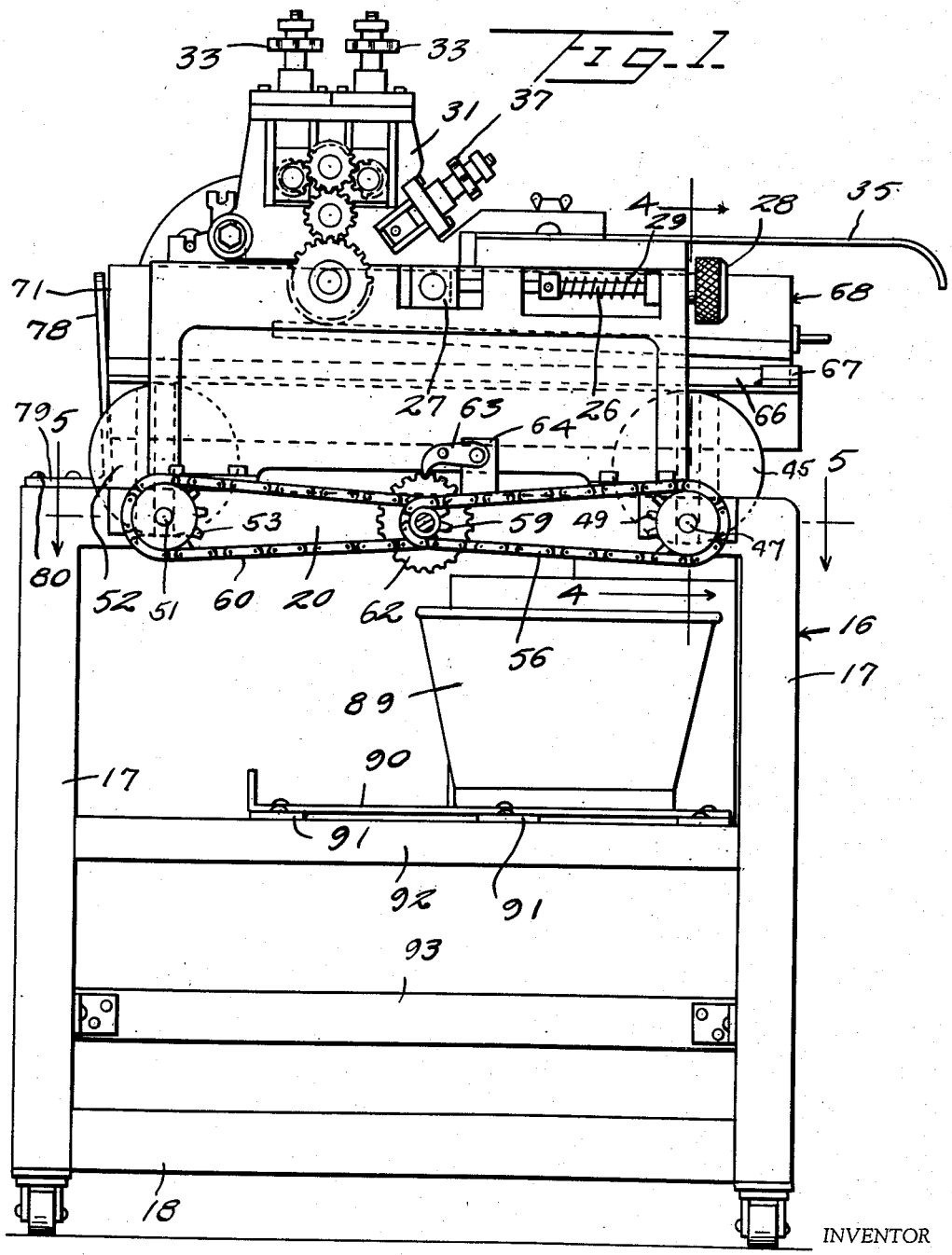
INVENTOR
Robert Minkow
BY Kimmel & Crowell
ATTORNEYS

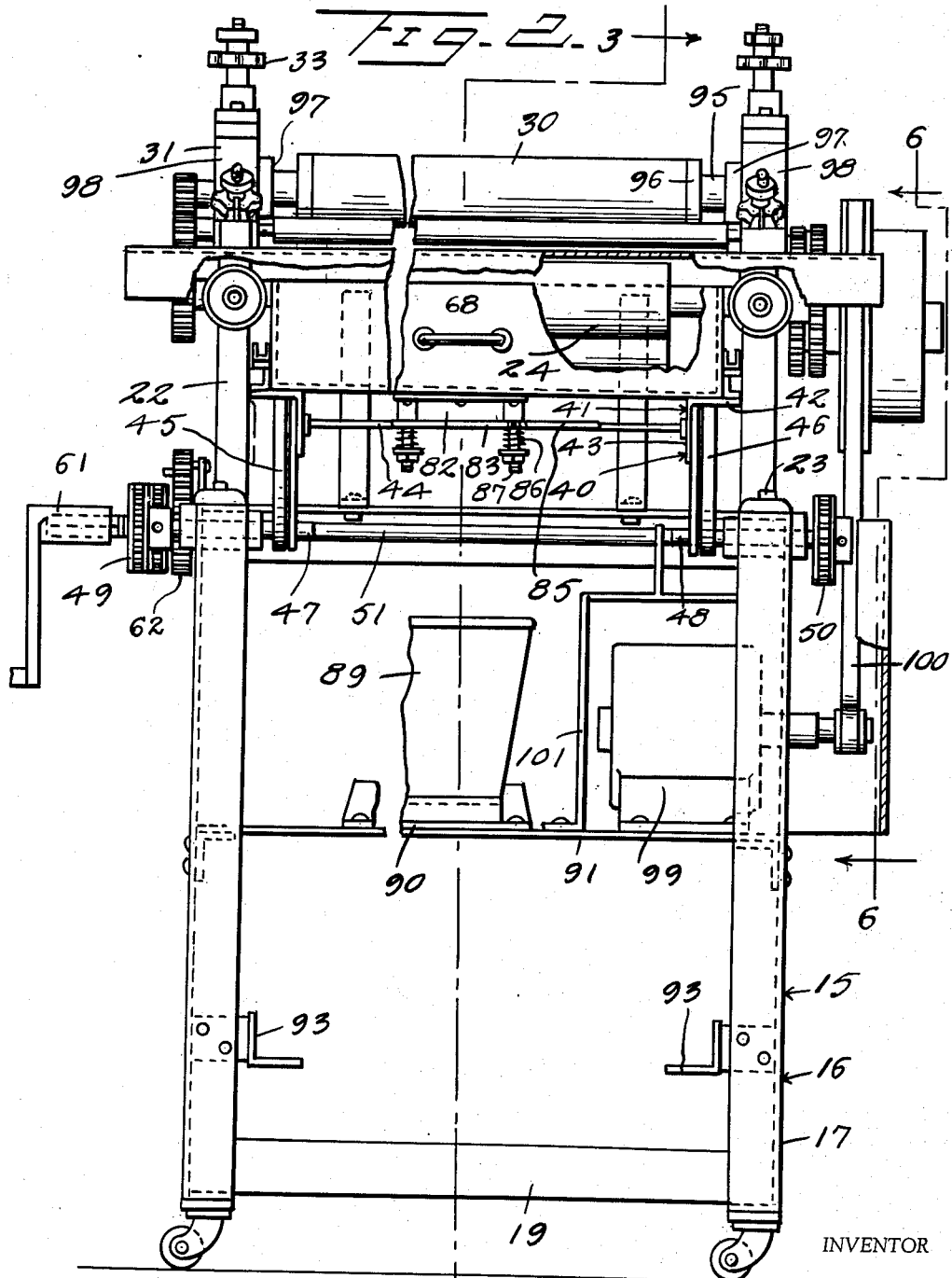

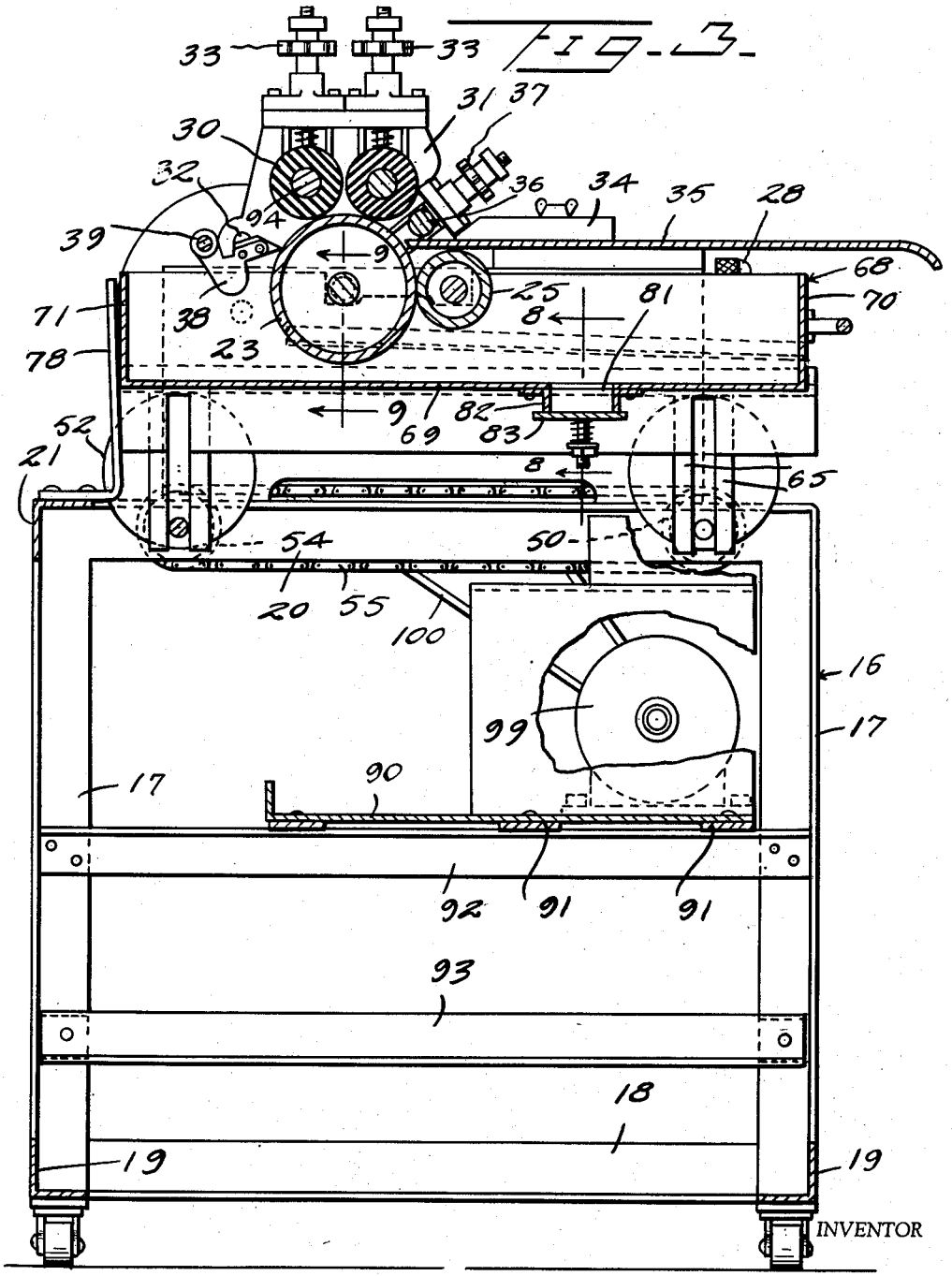

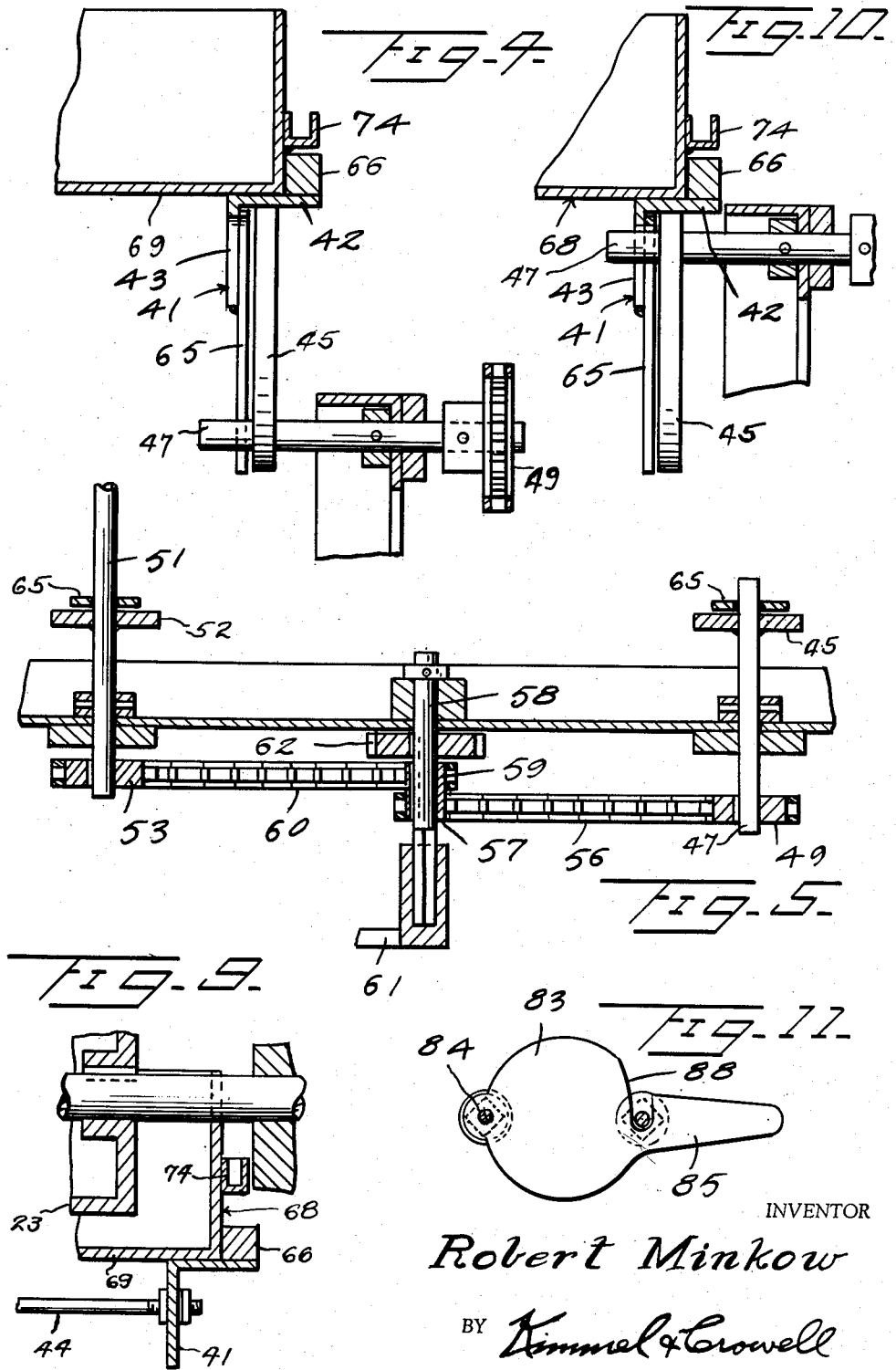

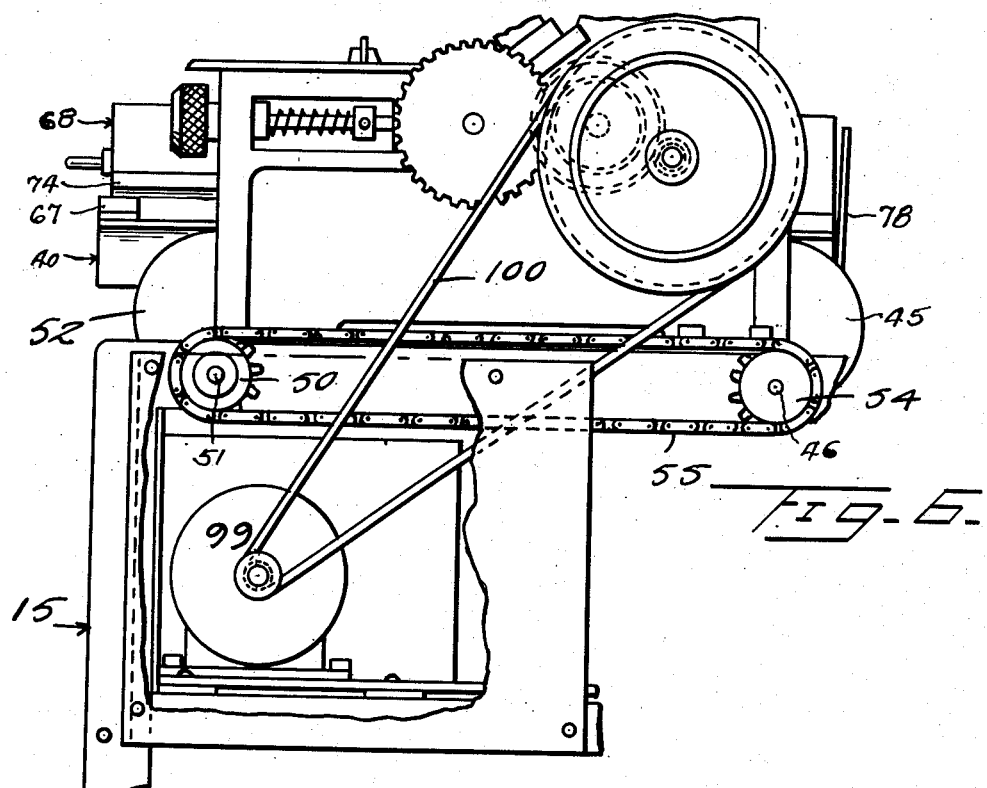
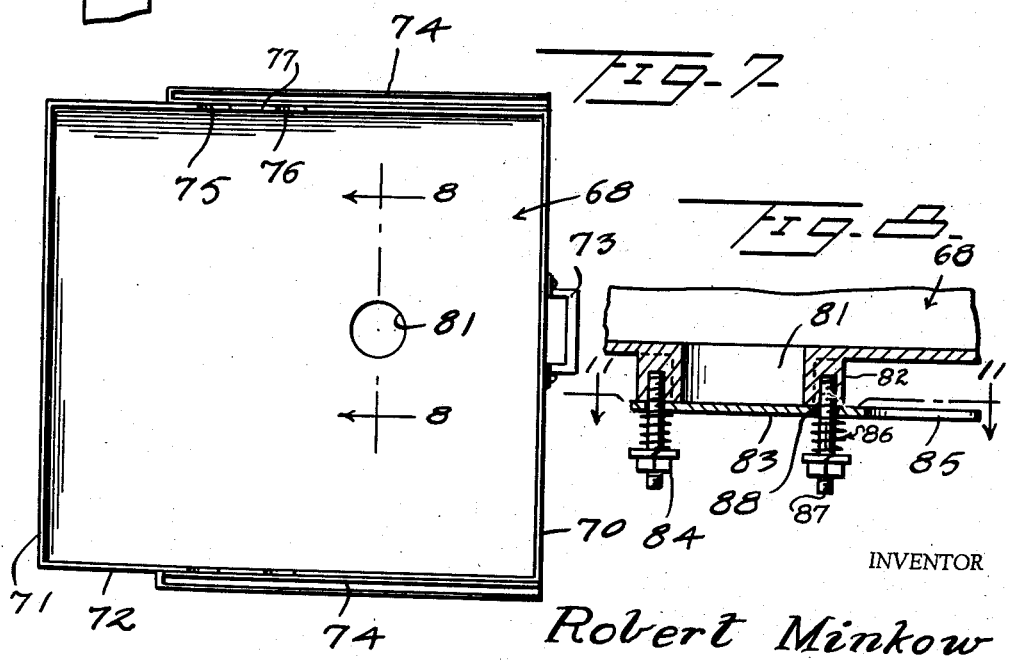

Patented Dec. 8, 1953

2,661,716

UNITED STATES PATENT OFFICE 2,661,716

MACHINE FOR APPLYING GLUE TO SHEET MATERIAL

Robert Minkow, New York, N. Y.

Application January 2, 1951, Serial No. 203,926

1 Claim. (Cl. 118—262)

This invention relates to a machine for applying glue, either hot or cold, or various types of adhesives or coatings, to various kinds of sheet material including paper, cardboard, fabrics, and materials used, for example, in paper box making or the manufacture of certain elements of luggage, and more especially to a machine of the type wherein the so-called glue pot or container for the material to be applied as before stated, is removable as contrasted to the usual stationary or fixed pot.

As disclosed herein, the machine is of the kind having rollers which extend into the pot or material container for applying the liquid or viscous coating, through suitable take-off rollers, to the place of application, as to the sheet, etc. If desired, the machine can be used for applying inks, colors, and other liquids to a sheet material surface or portion thereof.

One of the difficulties heretofore experienced in machines of this class is that the glue gets into the bearings of the rollers. The present invention eliminates this in the manner herein disclosed.

Another difficulty has been with the deterioration of the ends of the rubber rollers and this is also eliminated in the manner herein disclosed.

The present machine provides in addition to other advantages which will be apparent from the disclosure herein, for the ready removal or replacement of the glue container by a simple vertical movement thereof whereby in the up position the container is locked in proper position for its function and in the down position can readily be removed. It also provides means centrally of the container or pot whereby the contents can quickly be drained into a bucket or other suitable container, means being provided for the proper and convenient support of such bucket or vessel during the draining operation.

Preferably, the glue container or pot is made of stainless steel, but can be of other materials. It is light in weight, easily cleaned and readily handled with but little physical effort. Various changes of liquids, glues, etc. can be quickly made by a simple action and substitution of the herein provided glue pots or containers.

An object of this invention is to provide an improved gluing machine for applying glue to sheet material or rolls which will permit the use of heated or cold glue or adhesive of all types, or the application of ink or other colored liquid to the sheet material.

Another object of this invention is to provide a gluing machine having a vertically adjustable glue pan carrier which will permit the adjustment of the glue pan or reservoir to provide for proper immersion of the gluing roller in the liquid glue or adhesives.

A further object of this invention is to provide in a gluing machine, means whereby the glue will be held away from the roller bearings.

A further object of this invention is to provide a means for keeping the oil from the bearings from contacting the ends of the rubber pressure rollers.

With the above and other objects in view, my invention consists in the arrangement, combination and details of construction disclosed in the drawings and specification, and then more particularly pointed out in the appended claim.

In the drawings:

Figure 1 is a detailed side elevation of gluing machine constructed according to an embodiment of this invention.

Figure 2 is a detailed front elevation partly broken away and in section of the machine.

Figure 3 is a vertical section taken on the line 3—3 of Figure 2.

Figure 4 is a fragmentary sectional view taken on the line 4—4 of Figure 1.

Figure 5 is a fragmentary horizontal section taken on the line 5—5 of Figure 1.

Figure 6 is a fragmentary sectional view taken on the line 6—6 of Figure 2.

Figure 7 is a plan view of the removable reservoir or pan.

Figure 8 is a fragmentary sectional view taken on the line 8—8 of Figures 3 and 7.

Figure 9 is a fragmentary sectional view taken on the line 9—9 of Figure 3.

Figure 10 is a fragmentary sectional view similar to Figure 4, but showing the reservoir and carrier in lowered inoperative position.

Figure 11 is a sectional view taken on the line 11—11 of Figure 8.

Referring to the drawings the numeral 15 designates generally a base frame structure which is formed of a pair of inverted U-shaped side members 16 having the vertical legs 17 thereof connected together by means of connecting members 18. The legs 17 of one side frame 16 are connected together at their front and rear by means of lower connecting bars 19.

The base frame 15 includes upper horizontal bars 20 and also includes an upper rear horizontal connecting bar 21. A pair of upright side members 22 are secured by fastening means 23 to the horizontal frame members 20, and a gluing roller 23 is journalled between the side members 22 and has the opposite ends 24 thereof disposed inwardly from the bearings carried by the side members 22. A doctor roller 25 is rotatably disposed between the side members 22 in operative position with respect to the gluing roller 23 and is adjustable relative to the gluing roller 23 by adjusting rods 26 which are connected to the bearings 27 for the rollers 25.

A nut or calibrated wheel 28 is threaded on the outer end of each rod 26 and provides a means whereby the rod 26 is moved to the right as viewed in Figure 1 for moving the doctor roller 25 away from the gluing roller 23. A spring 29 engaging about the rod 26 provides for yieldably urging the doctor roller 25 in the direction of the gluing roller 23. A pair of rubber pressure rollers 30 are rotatably carried by a pair of lever members 31 which are rockably carried by pivot means 32 fixed relative to the side members 22. The pressure rollers 30 are disposed over the gluing roller 23 and are adjustable toward or from the latter by adjusting nuts 33.

The lever members 31 include forwardly projecting arms 34 to which a feeding table or material guide plate 35 is secured. A guiding roller 36 is disposed at the forward end of the table 35 being adjustably carried by the lever members 31 and adjusted by means of adjusting nuts 37. The gluing means also includes a plurality of sheet removing fingers 38 which are rockably carried by a transversely disposed rod 39 which is fixed by the side members 22 at the rear of the pressure rollers 30.

The construction of the gluing means hereinbefore described is similar to the gluing means embodied in my prior application, Serial No. 91,719, filed May 6, 1949, for Gluing Machine, now Patent No. 2,590,339 and Serial No. 2,270, filed January 1, 1948, for Gluing Machine, now Patent No. 2,554,587.

A reservoir carriage generally designated as 40 is disposed below the gluing roller 23 and the doctor roller 25 and is formed of a pair of oppositely disposed angle members 41 having an upper horizontal side 42 and a vertical depending or inner side 43. The angle members 31 are connected together by means of a connecting bolt 44. The carriage 40 is vertically adjustable by means of two front cams or eccentrics 45 and 46 which are fixedly mounted on stub shafts 47 and 48, respectively. The stub shafts 47 and 48 are journalled through the upper angle frame members 20 and the outer end of stub shaft 47 has fixed thereto a sprocket 49. A sprocket 50 is fixed to the outer end of stub shaft 48.

A transversely disposed shaft 51 is journalled across the frame 15 adjacent the rear thereof and shaft 51 has fixedly secured thereto a pair of eccentrics 52 which engage beneath the angle members 41 adjacent the rear thereof. Shaft 51 has fixed to one end thereof a sprocket 53 and has fixed to the opposite end thereof a second sprocket 54. The two sprockets 50 and 54 are connected together by an endless chain 55, and sprocket 49 has engaging thereabout a chain 56. Chain 56 also engages about a sprocket 57 which is fixed to a drive shaft 58 journalled in one of the upper frame members 20. The shaft 58 also has fixed thereto a second sprocket 59 about which a chain 60 engages, and chain 60 also engages about the rear sprocket 53 on cross shaft 51. A crank 61 is mounted on the outer end of shaft 58 and provides a means whereby shaft 58 may be rotated to provide for raising or lowering of the reservoir carriage 40.

Shaft 58 also has fixedly mounted thereon a ratchet wheel 62 which is engaged by a pawl or dog 63 carried by an upstanding support 64. The support 64 is secured to the adjacent upper frame member 20. The carriage 40 has fixedly secured thereto pairs of depending guide bars 65 which engage about the forward stub shafts and also engage about the rear cross shaft 51.

The carriage 40 also includes guide bars 66 secured to the upper sides of the angle members 41 and also includes short angle members 67 projecting from the forward end of each bar 66. A reservoir or glue pan generally designated as 68 is removably mounted on the upper sides 42 of the angle members 41 and is formed of a bottom 69, front and rear upright walls 70 and 71, and opposite side walls 72. A handle 73 is secured to the outer side of the front wall 70. The opposite sides 72 of the reservoir 68 have secured to the outer sides thereof a pair of downwardly and forwardly inclined troughs 74 which project from a pair of cutouts 75 and 76 formed in the sides 72. The cutouts 75 and 76 are slightly deeper than an intermediate cutout 77 and provide for raising of the reservoir 68 to a position wherein the trunnions of the rollers 23 and 25 may loosely engage in the cutouts 75 and 76 with the opposite sides 72 projecting above the axial centers of the rollers 23 and 25. A pair of stop members 78 are disposed in the rear of the base frame 15 being provided with lower base members 79 secured by fastening means 80 to the rear connecting bar 21.

The stop members 78 are disposed in a position whereby the rear of the reservoir or pan 68 will contact therewith to limit the rearward extension of the reservoir when the latter is placed on the carriage 40. The bottom wall 69 of the reservoir 68 has a drain opening 81 and a depending boss 82 projects from the bottom 69. A spring pressed drain valve plate 83 is pivotally mounted on a pivot 84 carried by the boss 82 and includes a handle 85. The valve plate 83 is held tight against the lower end of the boss 82 by means of a second spring 86 engaging about a bolt 87. The valve member 83 is formed with an arcuate slot 88 within which the bolt 87 is adapted to loosely engage. The glue or other liquid which is disposed in the reservoir or pan 68 is adapted to be drained into a receiver or bucket 89 which is removably mounted on a plate 90 secured to a plurality of cross bars 91.

The cross bars 91 are secured to horizontal longitudinal bars 92 which are secured to the legs 17 of the side members 15. A pair of angle members 93 are secured between the legs 17 below the angle members 92 and provide a shelf for removably supporting the reservoir or pan 68 when the latter is in inoperative or disengaged position with respect to the carriage 40. The pressure rollers 30 which are formed of rubber include a shaft 94, and a pair of spacer members 95 are fixed to the shaft 94 at the opposite ends of the rollers 30. The spacers 95 include inner annular flanges 96 bearing against the adjacent ends of the rollers 30 and also include annular flanges 97 bearing against the bearings 98 for the shafts 94. The spacer members 95 with the flanges 96 and 97 provide a means whereby the oil or lubricant for the shaft 94 will not come into contact with the ends of the pressure rollers 30.

A motor or power member 99 is carried by the cross bars 91 and provides a means through the medium of a belt 100 for rotating the rollers 23, 25, and 30. A guard member 101 is secured to the cross bars 91 being disposed at the inner side of the motor or power member 99 so that the glue or other liquid will be held out of contact with the motor 99.

In the use and operation of this gluing machine the glue which may be either hot or cold is disposed in the reservoir 68. The carriage 40 may be initially lowered by rotating the crank 61 so as to swing the eccentrics or cams downwardly. When the carriage 40 is in its lowered position as shown in Figure 10 the reservoir 68 is placed on the carriage 40 and then moved inwardly to the limit provided by the stop members. The carriage is then raised to dispose the reservoir 68 in its uppermost position with the trunnions of rollers 23 and 25 engaging in the cutouts 75 and 76 at the sides of the reservoir 68. The side members 72 of the reservoir 68 will provide a means whereby glue running over the ends of the rollers 23 and 25 will be held from contact with the bearings for these rollers. The glue or other liquid in the reservoir 68 may be drained when the reservoir 68 is in its elevated operative position only by swinging the valve member 83 forwardly so as to open the drain opening or outlet 81 and permit the liquid to drop into the receiver or bucket 89 mounted on the plate 90.

What I claim is:

A gluing machine comprising a base frame, a pair of upright side members carried by said frame, a gluing roller, a shaft carrying said roller rotatably journalled between said side members, a doctor roller, a shaft carrying said doctor roller rotatably journalled between said side members, spring means biasing said doctor roller toward said gluing roller, a reservoir carriage beneath said gluing roller, a pair of shafts journalled for rotation in said frame beneath said reservoir carriage, a pair of spaced cams carried by each shaft abutting the bottom of said reservoir carriage, for supporting the reservoir carriage for vertical adjustment, a common operator for rotating the shafts carrying the cams, a removable reservoir on said carriage, and means carried by said frame for locating the reservoir on the carriage, said reservoir including upright sides having cutout portions therein, said cutout portions receiving the journals of the roller shafts when the reservoir is raised to preclude contact of the journals with the glue in the reservoir.

ROBERT MINKOW.

References Cited in the file of this patent
UNITED STATES PATENTS

| Number | Name | Date |
|---|---|---|
| 504,215 | Hayward et al. | Aug. 29, 1893 |
| 939,396 | Daniels | Nov. 9, 1909 |
| 948,011 | Goldsmith | Feb. 1, 1910 |
| 1,210,269 | Bohaker | Dec. 26, 1916 |
| 1,846,856 | Francis | Feb. 23, 1932 |
| 1,942,605 | Koch | Jan. 9, 1934 |
| 2,142,318 | Langsner | Jan. 3, 1939 |
| 2,157,874 | Webb | May 9, 1939 |
| 2,249,024 | Minkow | July 5, 1941 |
| 2,444,878 | Marsh | July 6, 1948 |
| 2,461,388 | Minkow | Feb. 8, 1949 |
| 2,545,539 | Belluche et al. | Mar. 20, 1951 |